(12) United States Patent
Heidrich et al.

(10) Patent No.: US 8,733,574 B2
(45) Date of Patent: May 27, 2014

(54) VALVE UNIT FOR A PRESSURE VESSEL

(75) Inventors: Benjamin Heidrich, Idar-Oberstein (DE); Heiko Müller, Baumholder (DE); Joachim Neef, Herrstein (DE); Arnold Thelen, Idar-Oberstein (DE)

(73) Assignee: Fissler GmbH (DE)

( * ) Notice: Subject to any disclaimer, the term of this patent is extended or adjusted under 35 U.S.C. 154(b) by 319 days.

(21) Appl. No.: 13/131,164

(22) PCT Filed: Oct. 24, 2009

(86) PCT No.: PCT/EP2009/007619
§ 371 (c)(1),
(2), (4) Date: Aug. 11, 2011

(87) PCT Pub. No.: WO2010/060508
PCT Pub. Date: Jun. 3, 2010

(65) Prior Publication Data
US 2011/0290806 A1   Dec. 1, 2011

(30) Foreign Application Priority Data

Nov. 26, 2008  (DE) .......................... 10 2008 059 139

(51) Int. Cl.
*B65D 51/16* (2006.01)
(52) U.S. Cl.
USPC ............ 220/203.04; 220/203.23; 220/203.27; 220/203.29
(58) Field of Classification Search
USPC .................. 220/203.27, 267.1, 373, 201, 202, 220/203.01, 203.23, 203.29, 89.1, 203.19; 251/61.3, 61.4, 63.6
See application file for complete search history.

(56) References Cited

U.S. PATENT DOCUMENTS

| 2,297,378 | A | * | 9/1942 | Wittenberg | .................... 137/534 |
| 2,428,483 | A | * | 10/1947 | Wittenberg | .................... 137/493 |
| 3,973,364 | A | * | 8/1976 | Seaman | ............................ 52/57 |
| 4,461,452 | A | * | 7/1984 | Krejza | .......................... 251/144 |

(Continued)

FOREIGN PATENT DOCUMENTS

| DE | 26 06 676 A1 | 9/1977 |
| DE | 28 24 307 A1 | 12/1979 |

(Continued)

*Primary Examiner* — Anthony Stashick
*Assistant Examiner* — James Way
(74) *Attorney, Agent, or Firm* — Cantor Colburn LLP

(57) ABSTRACT

The invention relates to a valve unit for a pressure vessel, the latter consisting of a receptacle and a lid which can be placed on said receptacle in such a way as to make it pressure-tight and said valve unit including: a safety function, pressure-relief function and pressure indicator function; adjustable indicator levels and pressure levels; an indicator pin (4) or indicator piston (10) which is supported against an indicator spring (7), can move in axial direction and bears on its portion becoming visible upon pressurization, due to its emergence from a valve housing (12), indicator rings, for example, for indicating the pressure inside the vessel; and comprising a valve body (5) which is movable in axial direction against the action of an exhaust steam spring (6) and, in the closed position, rests against a seal seat (19), lifting off from this, when a given pressure inside the vessel is exceeded, to uncover a pressure-relief aperture (20), in which case both the indicator spring (7) and the exhaust steam spring (6) are braced in the same direction against a common, axially adjustable pressure member (8).

8 Claims, 1 Drawing Sheet

(56) References Cited

U.S. PATENT DOCUMENTS

| | | | | | |
|---|---|---|---|---|---|
| 4,741,325 | A | * | 5/1988 | Anota | 126/374.1 |
| 5,850,778 | A | * | 12/1998 | Fischbach | 99/342 |
| 6,007,045 | A | * | 12/1999 | Heiniger et al. | 251/63.5 |
| 6,158,606 | A | * | 12/2000 | Oliver | 220/203.04 |

FOREIGN PATENT DOCUMENTS

| | | |
|---|---|---|
| DE | 32 00 905 A1 | 7/1983 |
| DE | 86 24 077 U1 | 5/1988 |
| DE | 91 01 769 U1 | 5/1991 |

* cited by examiner

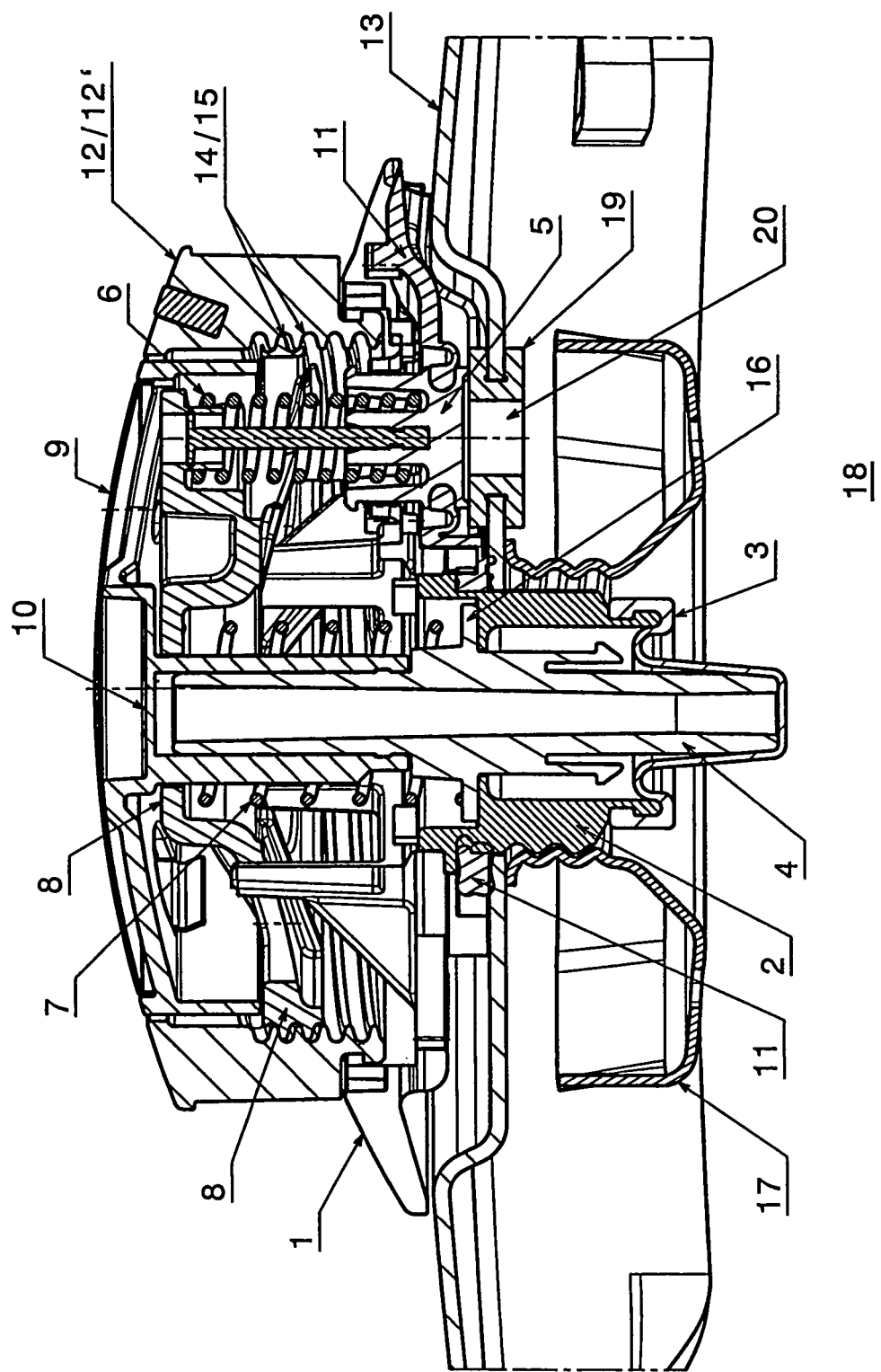

VALVE UNIT FOR A PRESSURE VESSEL

The invention relates to a valve unit for a pressure vessel, the latter consisting of a receptacle and a lid for placing on said receptacle in such a way as to make it pressure-tight and said valve unit including: a safety function, pressure-relief function and pressure indicator function; adjustable indicator levels and pressure levels; an indicator pin or indicator piston which is supported against an indicator spring, can move in axial direction and bears on its portion becoming visible upon pressurization, due to its emergence from a valve housing, ring-like indicator regions, for example, for indicating the pressure inside the vessel; and comprising a valve body which is axially movable against the action of an exhaust steam spring and, in the closed position, rests against a seal seat, lifting off from this, when a given pressure inside the vessel is exceeded, to uncover a pressure-relief aperture (air or steam outlet). Such valve units are particularly used with pressure cookers in the culinary field.

DE 32 00 905 C2 discloses a cooking valve for a pressure cooker, having a valve cap and an indicator pin carried therein which, due to the pressure inside the pot and as a function of said internal pressure, is displaced from a resting position against the force of an indicator spring, the position of the indicator pin serving as a pressure indicator, in that the indicator pin has at least two position-orientation marks in the portion emerging from the valve body as the pressure builds up. So that it is easier for the user to recognize when and if a regulation of the heat supply is required or whether the cooking process is progressing correctly, it is proposed that, on the outer surface of the indicator pin, indicator regions having visibly different surface finishes are provided, which either lie directly adjacent to one another or are merely separated from one another by a relatively narrow dividing line or space.

DE 86 24 077 U1 discloses a lid with cooking valve for a pressure cooker, comprising a valve body which, under the action of a valve spring, is pressed against a seal seat, from which said valve body lifts, thus uncovering at least one steam outlet channel when a given pressure inside the pot is exceeded. In order, with small overall height and with the use of simple components, to achieve a relatively large cross-section of flow of the at least one steam outlet channel, it is proposed that the seal seat should be formed at the edge of an opening in the wall of the lid or by means of a probe-ended, preferably circular valve seat seal inserted into the lid opening, and that the valve body should extend through the lid opening and, in the closed position, should rest from the outside, under the action of the valve spring, with a sealing edge against the edge of the lid opening or special valve seat seal.

DE 91 01 769 U1 discloses a cooking valve for a pressure cooker, comprising a valve body and an indicator body serving to indicate the pressure, said indicator body being mounted in said valve body in such a way as to be displaceable, and each being pressed by a spring into its respective resting position and being displaceable against the force of the respective spring by, and as a function of, the pressure inside the pot, in which case, when the valve body is displaced from its valve seat by the pressure inside the pot, the steam can escape from the interior of the pot through a suitable aperture, the pressure inside the pot being transmitted to the indicator body by a membrane fixed around it which seals off the space accommodating the indicator body from the interior of the pot. So as to ensure long-term reliable functioning with low production costs and whilst meeting close manufacturing tolerances, it is proposed that the membrane should also surround the valve body in its region facing the valve seat.

With the known solutions, coloured rings, for example, applied to the surface of the indicator pin serve to indicate the pressure inside the receptacle, the coloured rings being positioned for instance in such a way that, for example, they indicate 0.5 and 0.8 bar operating pressure of the cooker. And this irrespective of the fact that a pressure-relief device responds for example at 1.2 bar. The user, by keeping an eye on the indicator pin, can manually control the cooking levels through the power supply. Thus, response of the pressure-relief device as a first safety device required according to DIN can usually be avoided. With systems having a pin indicator where the steam-release device can be set for example in two stages, when the response pressure is set at 0.8 bar the indicator pin does not rise to the same extent as when it is set at 0.5 bar. However in this case, the user cannot read the indicator pressure ideally matched to the reduced pressure level. In particular, the lack of any adjustability in respect of the indicator range which correlates with the response pressure of the pressure-relief device has proved disadvantageous. With the known systems, the user is unable to set a 0 pressure level via the pressure-relief device when the pressure vessel is in the closed state. With the different cooking levels, no signals to turn down the heat are provided for indicating to the user when he should reduce the power after the pressure starts to build so as to reach the ideal cooking temperature without exceeding it, i.e. without the pressure-relief device responding. Nor does the user receive any visible information via the pin indicator in terms of the pressure being too high in the vessel; he only sees steam emerging when the valve responds.

It is the objective of the present invention to propose a valve unit of the afore mentioned type, with which the above-mentioned disadvantages are eliminated and with which in particular there is a correlation between indicator range of the indicator pin and response pressure of the pressure-relief device.

This objective is achieved with a valve unit of the afore mentioned type in that, for example, both the indicator spring and the exhaust steam spring are braced in the same direction against a common, axially adjustable pressure member.

The spring system and the travel of the pressure member are then configured in such a way that the response of the pressure-relief device correlates with the indicator signals of the indicator pin. With such a system, pressure-free cooking can, as a matter of principle, also be preselected as a setting. With every set cooking level, the user can now always keep an eye on the same image in the form of the indicator pin. A first—amber for example—(annular) indicator region (signal for turning down the heat) indicates to the user that the power supply should now be turned down to achieve an optimum cooking level; a second—for example green—(annular) indicator region (as operating-pressure signal) indicates that the optimum cooking level is being maintained; and a third—for example red—(annular) indicator region (as overpressure signal) indicates that the heat should definitely be turned down to prevent power and liquid losses. Therefore, colour combinations amber-green-red, familiar to the user from traffic lights (as a signal for caution, a signal to proceed and a signal to stop), can for example be used for the annular indicator regions on the outer surface of the indicator pin. The indicator pin of the adjustable pressure and indicator unit is thus ideally designed to include a signal for turning down the heat, in the form of a marking ring for example, and an overpressure signal, for example in the form of another marking ring, or other markings provided on the indicator pin or on an indicator piston moving along with said indicator pin.

In a particular embodiment of the invention, for simple operation of the valve unit, the pressure member can be adjusted in axial direction by turning a rotary element formed for example by the valve housing.

So as easily to be able to mount the valve unit per se on the lid of the pressure vessel, the rotary element is preferably rotatably mounted on a carrier plate which can be fixed to the lid and which also carries the other valve components.

To facilitate reliable operation in terms of the adjustability of the valve function and indicator function according to the invention, the pressure member can be provided with an external thread which cooperates with a corresponding internal thread of the rotary element. When the rotary element is turned, the pressure member, as abutment for the indicator spring and exhaust steam spring, consequently travels in axial direction within the valve housing either upwards or downwards according to the direction of rotation.

For safeguarding the mode of operation of the valve unit, the indicator pin can be supported, in a way known per se, by a rolling membrane having a simultaneous sealing function, the pressure inside the vessel acting upon said rolling membrane, and said indicator pin being drivable by said membrane.

The indicator pin can then include an indicator piston which—whilst being replaceable as needed and having an indicator portion with a larger cross-section than that of the indicator pin—carries the markings for the signals to be displayed by the indicator system.

The indicator pin or indicator piston is specifically provided on its outer circumferential surface or outer surface with at least one marking for displaying a signal to turn down the heat and/or an operating-pressure signal and/or an overpressure signal, for which purpose not only visual but also audible means can be utilized.

A covering cap for the top opening of the valve housing preferably closes the valve unit at the top.

The invention likewise relates to a lid for placing on a receptacle of a pressure vessel in such a way as to make it pressure-tight, the previously described valve unit being mounted in the at least one opening in the lid. The invention also relates to a pressure vessel having such a lid equipped with valve unit.

Further aims, features, advantages and possible applications of the invention will be made clear in the following description of working examples, with reference being made to the drawing. All the described and/or illustrated features, alone or in any combination, form the subject-matter of the invention, and this irrespective of their inclusion in individual claims or in claims which refer back to preceding claims.

The single drawing shows a vertical section through a working example of the valve unit embodying the invention.

The valve unit according to the invention has a carrier plate 1—fitted with a shaped seal 11—which carries all the valve components and can be mounted in an opening in a lid 13 which can be placed on the receptacle of a pressure vessel in such a way as to make it pressure-tight, in which case said carrier plate 1 can be fixed in place via a rolling-membrane seating member 2, projecting through the opening and provided with an external thread, and by means of a retaining nut 17.

The valve unit has an axially movable indicator pin 4, formed for example as a sleeve member, which on its portion emerging from the top of the valve housing 12 upon pressurization, or on a portion fitted with an indicator piston 10, carries circular markings, for example, which provide the user with information regarding the pressure conditions in the interior 18 of the vessel. The indicator pin 4 is supported by a so-called rolling membrane 3 which transmits the pressure prevailing in the pressure vessel to the indicator pin 4 and causes this to rise upwards to a greater or lesser degree. The rolling membrane 3 is held against the rolling-membrane seating member 2 in such a way as to encircle this, the latter for its part being attached to the carrier plate 1. The indicator pin 4 has, more or less in the middle of it, a circumferential flange 16 by which it rests against an indicator spring 7, and at the upper end of said indicator spring 7, opposite the rolling membrane 3, a pressure member 8, disposed so as to be coaxial with the indicator pin 4, serves as abutment for said indicator spring 7. A pressure-relief device in the valve unit is formed by a valve body 5 which, when the pressure in the interior 18 of the vessel rises, is lifted against the action of an exhaust steam spring 6 from a seal seat 19, thus uncovering a pressure-relief aperture. The exhaust steam spring 6 is supported at its lower end on the valve body 5, and the pressure member 8 also serves as abutment for said exhaust steam spring 6 at its upper end.

The valve housing, taking the form of a rotary element 12', is rotatably mounted on the carrier plate 1. The rotary element 12' has an internal thread 14, which cooperates with an external thread 15 of the pressure member 8 in such a way that, when the rotary element 12' is turned, the pressure member 8 moves to a greater or lesser degree from, for example, the uppermost axial position shown in the drawing downwards in axial direction, and thus the two abutments for the upper ends of the indicator spring 7 and the exhaust steam spring 6 move downwards equally, thus in correlation with one another, towards the interior of the vessel. The uppermost position of the pressure member 8, as shown in the drawing, represents a 0 pressure level for example, or more specifically a first level for pressure-free cooking, in which case no pressure can build inside the vessel. By continuing to turn the rotary element 12', the pressure member 8 can be brought into its lowest axial position at the lower end of the internal thread of the rotary element 12'.

The valve unit as represented in the drawing is in a pressure-free state, which can be seen from the fact that the indicator pin 4 and the indicator piston 10 carried along with it, with its indicator portion of increased diameter enlarged in its upper portion in the form of a bell relative to the indicator pin 4, still lies within the valve housing 12, and the outer circumferential surface of the indicator piston 10, which is concealed by a covering cap 9, cannot be seen. With a rise in pressure, the indicator portion of the indicator piston 10 moves further and further out of the valve housing 12 surrounding it so that the markings of different surface finish provided on the circumferential surface of the indicator piston 10 gradually become visible, that is to say for instance firstly displaying a signal marking for turning down the heat, then displaying an operating-pressure signal marking and finally, if applicable, displaying an overpressure signal marking.

LIST OF REFERENCE NUMERALS

1 Carrier plate
2 Rolling-membrane seating member
3 Rolling membrane
4 Indicator pin
5 Valve body
6 Exhaust steam spring
7 Indicator spring
8 Pressure member
9 Covering cap
10 Indicator piston
11 Shaped seal
12, 12' Valve housing; rotary element
13 Wall of the lid 14 Internal thread
15 External thread
16 Circumferential flange
17 Retaining nut
18 Interior of the vessel
19 Seal seat
20 Pressure-relief aperture

The invention claimed is:

1. A valve unit for a pressure vessel, the latter consisting of a receptacle and a lid which can be placed on said receptacle in such a way as to make it pressure-tight and said valve unit including: a safety function, pressure-relief function and pressure indicator function; adjustable indicator levels and pressure levels; an indicator pin (4) or indicator piston, which is supported against an indicator spring (7), can move in axial direction and bears on its portion becoming visible upon pressurization, due to its emergence from a valve housing (12), circular indicator regions, for indicating the pressure inside the vessel; and comprising a valve body (5) which is movable in axial direction against the action of an exhaust steam spring (6) and, in the closed position, rests against a seal seat (19), lifting off from this, when a given internal pressure of the vessel is exceeded, to uncover a pressure-relief aperture (20), wherein both the indicator spring (7) and the exhaust steam spring (6) are braced in the same direction against a common, axially adjustable pressure member (8), the pressure member (8) being an abutment for the indicator spring (7) and the exhaust steam spring (6) and provides abutments for the ends of the indicator spring (7) and the exhaust steam spring (6), and the pressure member (8) being adjustable in an axial direction with respect to the lid by turning a rotary element (12') formed by the valve housing so that the abutments for the indicator spring (7) and the exhaust steam spring (6) move equally with respect to the lid, wherein the pressure member (8) is a separate element within the valve housing that has an external thread, which cooperates with a corresponding internal thread of the rotary element (12').

2. A valve unit according to claim 1, wherein the valve unit comprises a carrier plate (1) and the rotary element is rotatably mounted on said carrier plate which also carries the other valve components.

3. A valve unit according to claim 1, wherein the indicator pin (4) is supported by a rolling membrane (3) having a simultaneous sealing function, the pressure inside the vessel acting on said rolling membrane (3) and said indicator pin (4) being drivable in axial direction.

4. A valve unit according to claim 1, wherein the indicator pin (4) carries an indicator piston (10) for forming its indicator portion.

5. A valve unit according to claim 4, wherein the indicator pin (4) or indicator piston (10) carries on its outer circumferential surface at least one marking for indicating a signal to turn down the heat and/or an operating-pressure signal and/or an overpressure signal, or else it triggers signals of that type when it moves.

6. A valve unit according to claim 1, wherein the top opening of the valve housing (12) is covered by a cover plate (9).

7. A lid for placing on the receptacle of a pressure vessel in such a way as to make it pressure-tight, wherein a valve unit according to claim 1 is inserted into an opening in the wall of the lid.

8. A pressure vessel consisting of a receptacle and a lid which can be placed on said receptacle in such a way as to make it pressure-tight, wherein the lid is designed according to claim 7.

* * * * *